Figure 1:
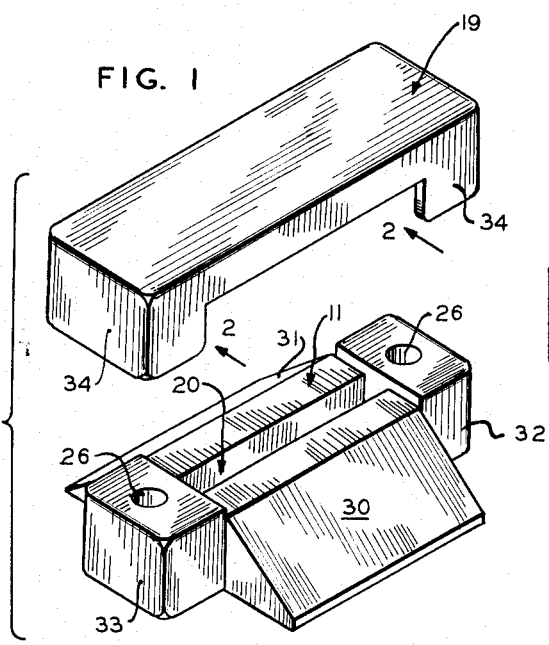

Nov. 30, 1965    R. W. CROGHAN    3,221,096
ELECTRICAL SPLICER BLOCK FOR RIBBON TYPE CABLES
Filed Jan. 28, 1963                    2 Sheets-Sheet 1

INVENTOR
ROBERT W. CROGHAN
BY
ATTORNEY

Nov. 30, 1965    R. W. CROGHAN    3,221,096
ELECTRICAL SPLICER BLOCK FOR RIBBON TYPE CABLES
Filed Jan. 28, 1963    2 Sheets-Sheet 2

INVENTOR
ROBERT W. CROGHAN

BY
ATTORNEY

United States Patent Office

3,221,096
Patented Nov. 30, 1965

3,221,096
ELECTRICAL SPLICER BLOCK FOR RIBBON
TYPE CABLES
Robert W. Croghan, Staten Island, N.Y., assignor to The
Thomas & Betts Co., a corporation of New Jersey
Filed Jan. 28, 1963, Ser. No. 254,056
6 Claims. (Cl. 174—88)

This invention relates to a device for splicing and electrically connecting conductors at the ends of ribbon type cables and is especially used as a rapid connect unit for ribbon type cables wherein conductors are dielectrically enclosed in enveloping sheaths. The invention includes novel means, as set forth below, for automatically interconnecting conductors and for automatically latching the parts on assembly with ends of the cables effectively protected and covered therein and secured.

The drawings, illustrating procedures and devices useful in carrying out the invention, and the description below, are exemplary only of the invention, which shall be deemed to cover all other devices and procedures coming within the scope and purview of the appended claims.

Figure 2:
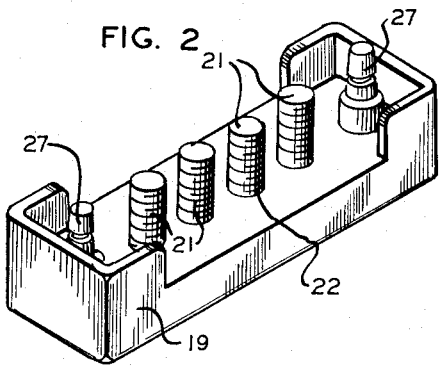
Figure 3:
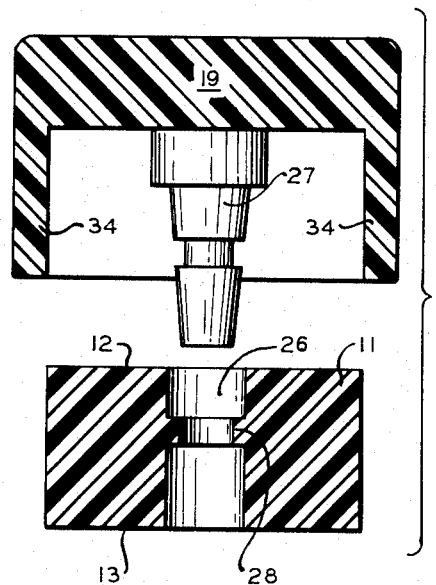
Figure 4:
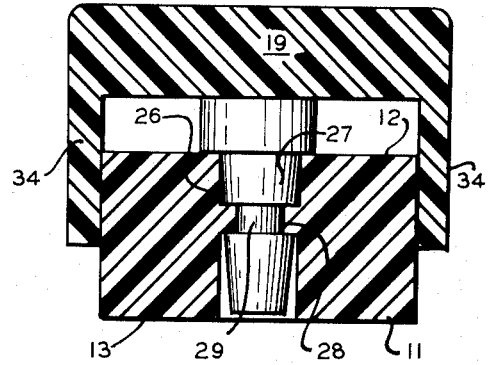
Figure 5:
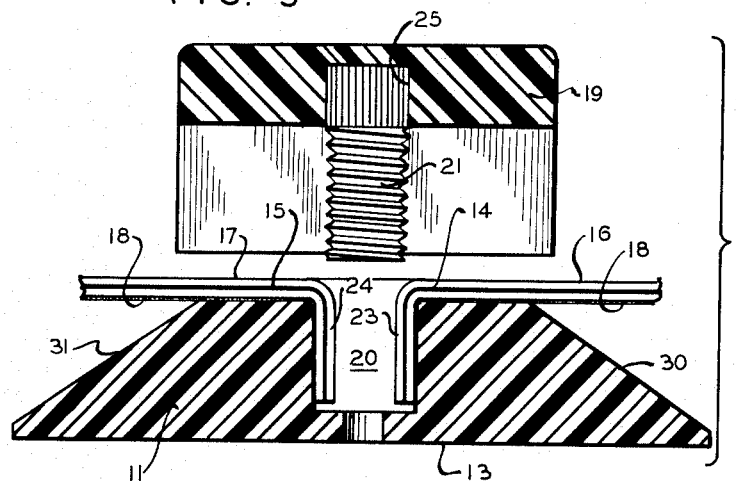
Figure 6:
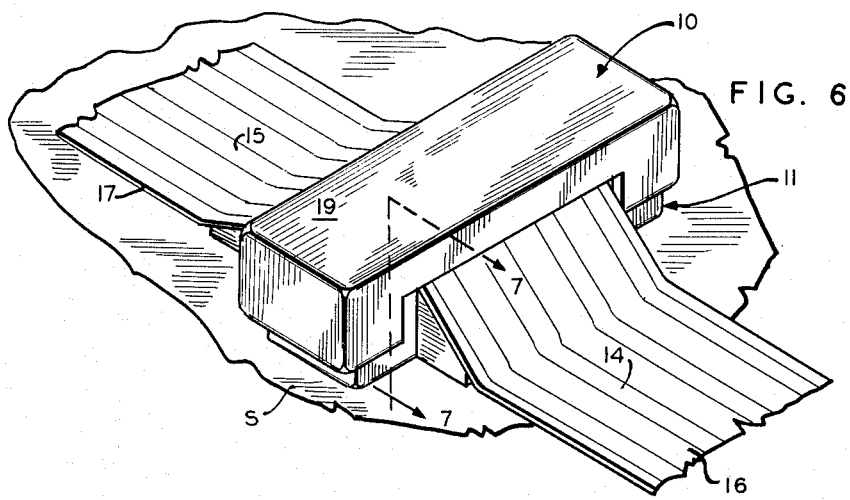
Figure 7:
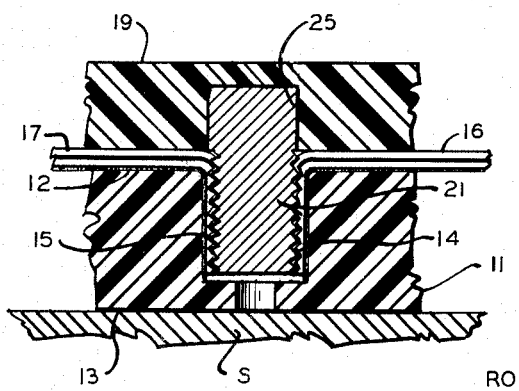

In the drawings, wherein similar reference characters indicate like parts:

FIG. 1 is a perspective view of a base and top members of a device embodying the invention, FIG. 2 is an underplan view of the top member, taken at line 2—2 of FIG. 1, FIG. 3 is an enlarged vertical sectional view of ends of the parts of the device of this invention, prior to assembly, FIG. 4 is a similar view of said parts assembled, FIG. 5 is an enlarged sectional view of the device with ribbon type cables shown disposed on the base member prior to completion of the interconnecting and assembly procedure, FIG. 6 is a perspective view of the device assembled on a supporting surface and interconnecting the cable ends, and FIG. 7 is an enlarged vertical sectional view taken at line 7—7 of FIG. 6.

As shown in the drawings, the device 10 (FIG. 6) of this invention comprises a base member 11 and a top member 19 preferably molded or otherwise formed of dielectric plastic or other suitable materials. The base member is provided with oppositely disposed faces 12, 13 (FIG. 4) and is adapted to be disposed with one of said faces (13) on a supporting surface S (FIG. 6), which may be the wall, a station fixture or other area in a building wherein it is desired to interconnect conductors 14, 15. Conductors 14, 15 may be enveloped in dielectric sheaths, defining therewith ribbon type cables 16, 17 (FIG. 6) well known to those skilled in this art. The cables may be secured to supporting surfaces S by any suitable securing means as, for example, by providing a pressure or other sensitive adhesive to the underside 18 (FIG. 5) of the conductor tapes.

The base member 11 is provided with a vertically walled slot 20 (FIGS. 1 and 5) opening inwardly of the base member; connector top member 19 may be telescopically disposed over the base member (FIGS. 1 and 3) and moved downwardly thereon to complete the assembly operation (FIG. 6). A pin or pins 21 (FIG. 2) depend from the top member for reception in the slot 20 and are provided with a threaded or otherwise roughened exterior surface 22 (FIGS. 2 and 7), the parts being so proportioned when the top member is so telescopically disposed over the base member and moved downwardly thereon with the said ends of the ribbon type cables bent into the slot and against the walls thereof (FIG. 5) that the pins will broach the insulation away (FIG. 7) and thus electrically connect the conductors engaged by each pin.

Pursuant to the invention one or more of the conductors in the cables may be terminated or discontinued in advance of the ends 23, 24 (FIG. 5) bent into the slot 20 (FIG. 5) so as *not* to be connected in the assembly operation.

Pins 21 may be insert molded in the connector members 19 or friction fitted into apertures 25 (FIG. 5) formed therein or otherwise assembled therewith. Complementary interengaging means are provided on the top and base members 19 and 11 so that when parts are assembled and the pins engage the conductors, said interengaging members will hold the parts latched and will enclose the connected ends 23, 24 of the ribbon type cables 16, 17. Said complementary interengaging means may comprise means for latching them together on insertion of the pin in the slot—for example, apertures 26 (FIG. 1) formed in one of said base and top members and studs 27 formed on the other of the said members for registration with the apertures when the parts are assembled and complementary means in said apertures for latching engagement with said studs. For example, the apertures may be provided with unitarily or separately formed ring portions 28 (FIG. 4) to engage undercut portions 29 in the studs 27; the ring portions 28 may be molded or otherwise formed in the aperture and of less diameters than said apertures. Base members 11 may be provided with angularly disposed side portions 30, 31 (FIGS. 1 and 5) intermediate the faces 12, 13 thereof, disposed upwardly, inwardly toward the slot 20 so that the cables whose ends are positioned in the slot may be disposed over the side portions 20, 31 of the base and onto the supporting surface 5 (FIG. 6) to so secure said device to said surface. The pins 21 may be of any number desired for carrying out the invention pursuant to the foregoing. In FIG. 2 by way of example, four of such pins are shown. The number of pins corresponds with the number of conductors to be connected in the ribbon type cables. To this end the slot 20 would be elongated to receive the pins. The base member is preferably provided with longitudinal end blocks 32, 33 (FIG. 1) formed thereon and the top member 19 is provided with complementary marginal ends to telescopically overlie said end blocks and base member when top member is so moved downwardly on the base member (FIG. 4).

The exterior surface 22 of the pin 21 is threaded or otherwise roughened so that on assembly of the parts (FIG. 3 to FIG. 4 position) the pin will skive and broach the insulation away and thus electrically connect the conductors engaged by the pin. Any roughened exterior surface 22 (FIG. 2) may be provided along the pin suitable for such skiving, broaching purposes, thus providing the pin with a plurality of axial skiving surfaces, so that if one roughened surface does not skive the conductor insulation the others will, on assembly of the parts.

Having thus described my invention, what I claim as new and desire to secure by Letters Patent is:

1. As an article of manufacture, a block for electrically connecting conductors at the ends of two ribbon type cables each having at least one conductor enclosed in a dielectric sheath, comprising a base member of insulating material having oppositely disposed faces and adapted to be disposed with one of said faces toward a supporting surface, an elongated slot defined by vertical side walls provided in the opposite face of the base member and opening inwardly thereof and adapted to receive the ends of said cables therein parallel to, and in contact with said walls, a top member of insulated material telescopically disposed over the base member, at least one electrically conductive pin non-rotatably fixed to and extending vertically downward from the top member and received in said slot, a roughened exterior surface on said pin, the dimensions of said pin and said slot being so related that when the top member is so telescopically disposed on the base member and moved downwardly thereon, with the said ends of the ribbon type cables disposed in the slot, the pin penetrates the dielectric sheaths of each of said cables and electrically connects the conductors thus exposed and engaged by the pin.

2. In an article of manufacture for electrically connecting conductor cables, as set forth in claim 1, complementary interengaging means on the base and top members for latching them together on insertion of the pin in the slot.

3. In an article of manufacture for electrically connecting conductor cables, as set forth in claim 2, said interengaging means comprising apertures formed in one of said base and top members and studs on the other said member in registration with said apertures when said top member is so moved downwardly on the base member, said studs having a circumferentially recessed portion and complementary means disposed in said apertures for latching engagement with said recessed portion of said studs.

4. In an article of manufacture for electrically connecting conductor cables, as set forth in claim 1, said base member being provided with angularly disposed side portions, directed upwardly and inwardly from said one face toward the slot for positioning the portions of the cables adjacent the portions disposed in the slot over said side portions of the base and onto the supporting surface.

5. An electrical connection comprising, a base member of insulated material having oppositely disposed faces and adapted to be disposed with one of said faces toward a supporting surface, an elongated slot defined by vertical side walls provided in the opposite face of the base member and opening inwardly thereof, a pair of ribbon type cables each having at least one conductor enclosed in a dielectric sheath, the ends of each of said cables being received within said slot parallel to and in contact with one of said walls, a top member telescopically disposed over the base member, an electrically conductive pin non-rotatably secured and extending vertically downward from the top member and received in the said slot between said cables, the surface of said pin being roughened and tightly engaging each of said cables, the roughened surface of the pin penetrating the dielectric sheath of each of said cables and electrically interconnecting the same upon assembly of said top member to said base member.

6. In an electrical connection, as set forth in claim 5, adhesive means on the ribbon type cables engaging side portions of the base member and the supporting surface securing said device to said surface.

References Cited by the Examiner
UNITED STATES PATENTS

| | | | |
|---|---|---|---|
| 2,799,838 | 7/1957 | Kribbs | 174—88 X |
| 3,088,090 | 4/1963 | Cole et al. | |
| 3,102,767 | 9/1963 | Schnek | 339—17 X |
| 3,115,541 | 12/1963 | Hanner et al. | 174—88 X |

OTHER REFERENCES

Smith et al.: "Making the Most of Flat Cables," Part I, published in Electronic Design, Oct. 14, 1959, pages 56–59.

JOHN F. BURNS, *Primary Examiner.*

JOHN P. WILDMAN, *Examiner.*